May 12, 1959   A. O. ROBERTS   2,885,904
VEHICLE STEERING GEAR

Filed Aug. 20, 1956   2 Sheets-Sheet 1

A.O. ROBERTS
INVENTOR.

BY E.C. McRae
J.R. Faulkner
D.H. Oster

ATTORNEYS

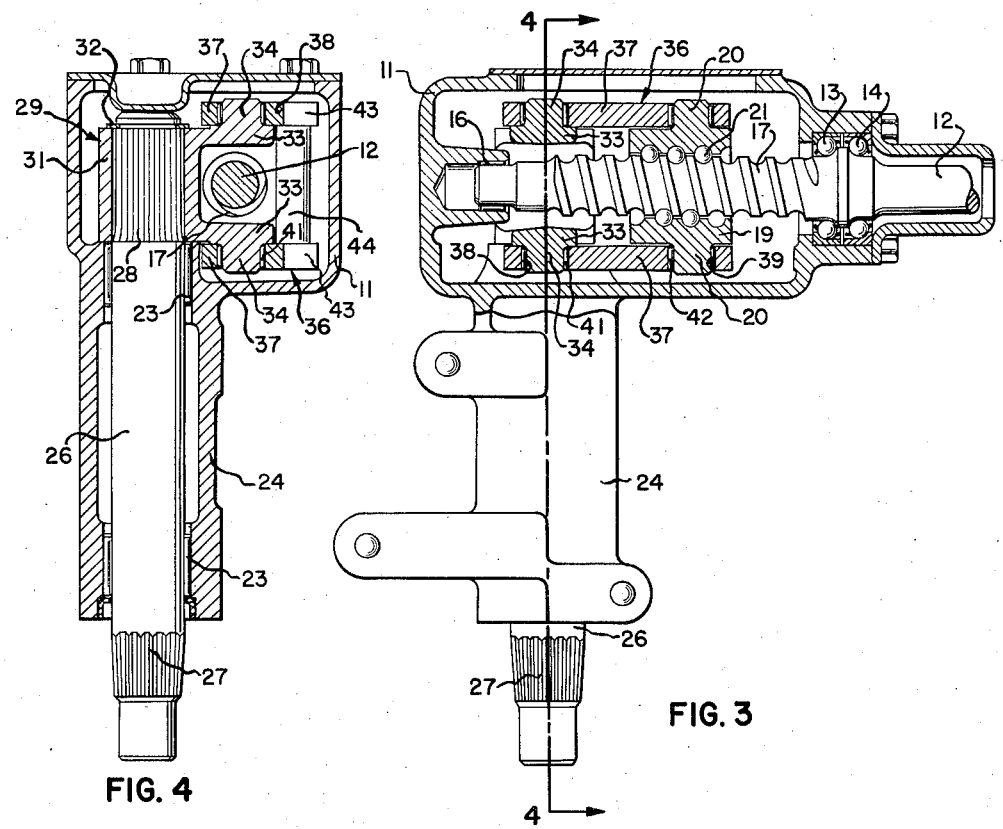
FIG. 4
FIG. 3
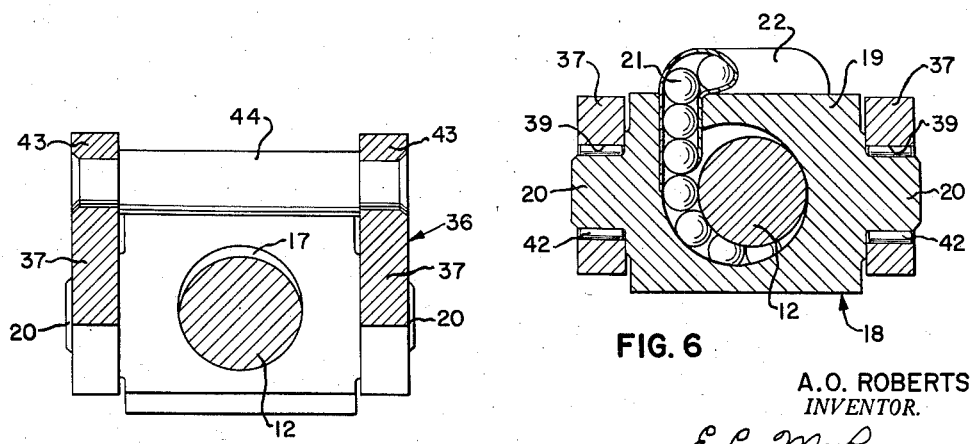
FIG. 7
FIG. 6
A. O. ROBERTS
INVENTOR.
BY E. C. McRae
J. R. Faulkner
F. H. Oster
ATTORNEYS

2,885,904

VEHICLE STEERING GEAR

Albert O. Roberts, Dearborn, Mich., assignor to Ford Motor Company, Dearborn, Mich., a corporation of Delaware Application August 20, 1956, Serial No. 605,046

1 Claim. (Cl. 74—499)

This invention relates generally to steering gears for motor vehicles and particularly to steering gears of the worm and ball nut type.

An object of the present invention is to provide a vehicle steering gear of the ball nut type having efficient operating characteristics and icorporating means restraining rotation of the nut about its screw. In an embodiment of the invention a crank arm mounted upon the pitman arm shaft is interconnected by means of a link to the ball nut. The crank arm has bifurcated arms straddling the screw and a pair of links are disposed at opposite sides of the screw and are pivotally connected at their opposite ends to the bifurcated crank arms and to trunnions extending from opposite sides of the ball nut. Means are also provided for interconnecting the two links to form a unit assembly and to restrain the nut from turning about the screw.

Other objects and advantages of this invention will be made more apparent as this description proceeds, particularly when considered in connection with the accompanying drawings, wherein:

Figure 3 is a cross sectional view taken on the line 3—3 of Figure 1.

Figure 4 is a cross sectional view taken on the line 4—4 of Figure 3.

Figure 6 is a cross sectional view through the ball nut.

Figure 7 is a cross sectional view taken on the line 7—7 of Figure 1.

Figure 1:
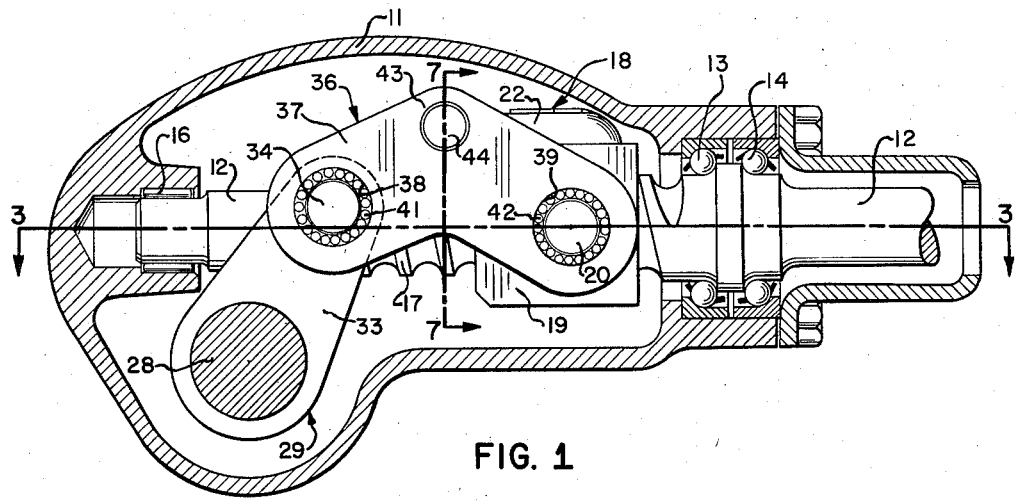
Figure 1 is a cross sectional view through a steering gear embodying the present invention, with the crank arm, link assembly, and ball nut being shown in elevation.

Referring now to the drawings, the reference character 11 indicates the housing of a vehicle steering gear. A steering shaft 12 is journaled in the housing 11 upon thrust ball bearings 13 and 14 and needle bearings 16. A screw 17 is formed on the steering shaft 12 intermediate its ends for cooperation with a recirculating ball nut assembly 18.

The ball nut assembly 18 comprises a nut 19 internally grooved to receive a series of balls 21 conventionally arranged for recirculation through a diagonally extending transfer tube 22. It will be seen that rotation of the steering shaft 12, which is connected to the vehicle steering wheel (not shown), results in axial movement of the ball nut assembly along the screw 17 in one direction or the other depending upon the direction of rotation of the steering shaft. The ball nut 19 is formed with integral oppositely extending trunnions 20.

Journaled upon bearings 23 in an extension 24 of the steering gear housing 11 and extending generally at right angles to the axis of the steering shaft 12 is a pitman arm shaft 26. The pitman arm shaft conventionally extends beyond the housing extension 24 and is splined at 27 to receive a pitman arm arranged to be connected by steering linkage to the steerable front road wheels of the vehicle.

The inner end 28 of the pitman arm shaft 26 is splined and extends in close proximity to the steering shaft 12. A crank arm 29 is nonrotatably carried on the pitman arm shaft 26, the hub 31 of the crank arm being splined upon the inner end portion 28 of the shaft and being held thereon by means of a retaining ring 32. As best seen in Figure 4, the crank arm 29 is formed with a pair of integral bifurcated arms 33 straddling the steering shaft 12 and the screw 17, and the bifurcated arms 33 are in turn provided with integral oppositely extending trunnions 34.

A link assembly 36 interconnects the crank arm 29 and the ball nut assembly 18. The link assembly 36 is formed of a pair of identical links 37 disposed parallel to and on opposite sides of the steering shaft 12 and screw 17. The links 37 are provided adjacent their opposite ends with circular openings 38 and 39 embracing the trunnions 34 and 20 respectively and pivotally connected thereto by means of antifriction needle bearings 41 and 42.

Figure 2:
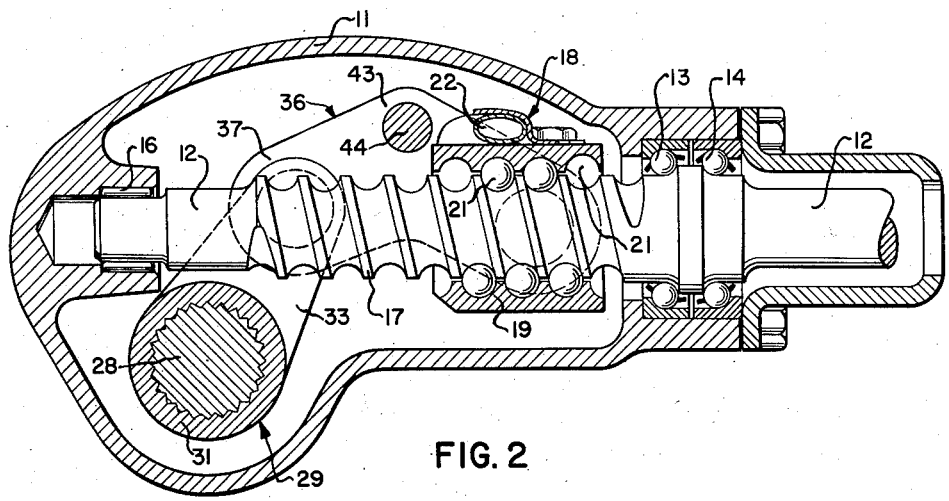
Figure 2 is a cross sectional view similar to Figure 1 but with the crank arm, link assembly and nut shown in section.
Figure 5:
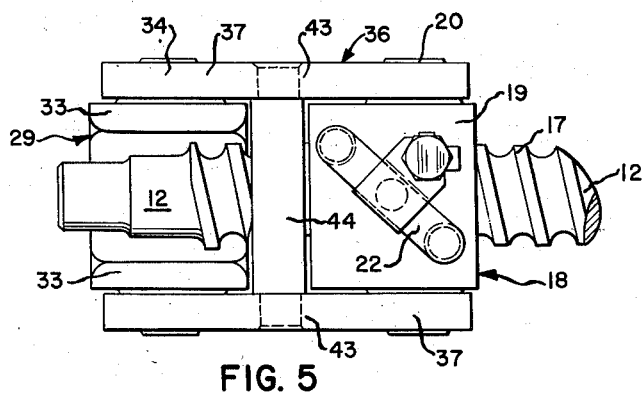
Figure 5 is an elevational view of a portion of the structure shown in Figure 1.

It will be noted from Figures 1 and 2 that the links 37 are formed of flat stock so shaped as to provide intermediate portions 43 extending laterally from the axis of the steering shaft 12.

Referring now to Figure 7, a shouldered pin 44 extends between the intermediate portions 43 of the links 37 and is riveted to the links. The pin 44 serves as a spacer to properly space the two links apart and also serves to join the links into an assembly sufficiently rigid to restrain any tendency of the nut assembly 18 to turn on the screw 17.

It will be noted that the pivotal connections between the links 37 and the integral trunnions 20 of the ball nut 19 lie on an axis extending at right angles to, and intersecting, the axis of the steering shaft 12 and screw 17. A balanced loading condition results, and an efficient steering gear is provided. Any tendency of the ball nut 19 to turn on its axis will be transmitted by means of the interconnected links 37 to the bifurcated arms 33 of the crank arm 29 which in turn is anchored upon the inner end of the pitman arm shaft 26.

It will be understood that the invention is not to be limited to the exact construction shown and described, but that various changes and modifications may be made without departing from the spirit and scope of the invention, as defined in the appended claim.

What is claimed is:

In a vehicle steering gear, a housing, a screw journaled in said housing, a nut mounted on said screw for axial movement therealong as said screw is rotated, a shaft journaled in said housing, the axis of said shaft being laterally spaced from and extending substantially at right angles to the axis of said screw, a crank on said shaft having bifurcated arms integral therewith straddling said screw, and a pair of links one on each side of said screw, one end of each of said links being pivotally connected to the bifurcated arms of said crank and the opposite ends of said links being pivotally connected to said nut on opposite sides thereof, said last named pivotal connections being aligned with each other on an axis extending at right angles to the axis of said screw and intersecting the axis of said screw to transmit axial movement of said nut along said screw into rocking movement of said crank and said shaft with the forces on said nut and screw being balanced about the axis thereof, the plane including both pivot axes of said links being maintained at a minimum angular relationship to the axis of said screw within the range of movement of said nut therealong, said links having coplanar extensions projecting beyond one side of said screw in an intermediate zone between the pivotal connections of said links to said crank and said nut respectively, and an interconnecting spacer extending between said intermediate extensions and rigidly connected thereto.

References Cited in the file of this patent

UNITED STATES PATENTS

| | | |
|---|---|---|
| 852,847 | Rockwell | May 7, 1907 |
| 1,512,424 | Jones | Oct. 21, 1924 |
| 1,827,711 | Searles | Oct. 13, 1931 |
| 2,648,995 | Doerfner et al. | Aug. 18, 1953 |

FOREIGN PATENTS

| | | |
|---|---|---|
| 36,567 | Denmark | Sept. 20, 1926 |
| 435 | Great Britain | Jan. 7, 1903 |